United States Patent
Holmes et al.

(10) Patent No.: US 7,054,042 B2
(45) Date of Patent: May 30, 2006

(54) OPTICALLY VARIABLE SECURITY DEVICE

(75) Inventors: Brian William Holmes, Surrey (GB); Kenneth John Drinkwater, Surrey (GB); Ralph Kay, Basingstoke (GB)

(73) Assignee: De la Rue International Limited, Basingtoke (GB)

( * ) Notice: Subject to any disclaimer, the term of this patent is extended or adjusted under 35 U.S.C. 154(b) by 139 days.

(21) Appl. No.: 10/257,212

(22) PCT Filed: Jun. 27, 2001

(86) PCT No.: PCT/GB01/02902

§ 371 (c)(1),
(2), (4) Date: Oct. 10, 2002

(87) PCT Pub. No.: WO02/00445

PCT Pub. Date: Jan. 3, 2002

(65) Prior Publication Data

US 2003/0058491 A1    Mar. 27, 2003

(30) Foreign Application Priority Data

Jun. 28, 2000  (GB) ................................ 0015873.3

(51) Int. Cl.
*G03H 1/00*  (2006.01)

(52) U.S. Cl. ......................................................... 359/2

(58) Field of Classification Search .................... 359/2, 359/580, 585, 587, 589; 283/86
See application file for complete search history.

(56) References Cited

U.S. PATENT DOCUMENTS

| | | | |
|---|---|---|---|
| 4,779,898 A | 10/1988 | Berning et al. | 283/58 |
| 4,930,866 A | 6/1990 | Berning et al. | 359/589 |
| 5,492,370 A * | 2/1996 | Chatwin et al. | 283/110 |
| 5,700,550 A * | 12/1997 | Uyama et al. | 428/212 |
| 5,712,731 A | 1/1998 | Drinkwater et al. | 359/619 |
| 6,043,936 A * | 3/2000 | Large | 359/572 |
| 6,337,752 B1 * | 1/2002 | Heckenkamp et al. | 359/2 |
| 6,531,230 B1 * | 3/2003 | Weber et al. | 428/480 |
| 6,545,809 B1 * | 4/2003 | Phillips | 359/577 |
| 6,761,959 B1 * | 7/2004 | Bonkowski et al. | 428/156 |

FOREIGN PATENT DOCUMENTS

| | | |
|---|---|---|
| CA | 2179566 | 2/1997 |
| GB | 2 300 379 A | 11/1996 |

* cited by examiner

*Primary Examiner*—Mark A. Robinson
*Assistant Examiner*—Alessandro Amari
(74) *Attorney, Agent, or Firm*—Oliff & Berridge, PLC

(57) ABSTRACT

An optically variable security device comprising a thin film reflection filter structure (23) which exhibits a first optically variable effect; and a relief structure (20) on or in the thin film reflection filter structure which exhibits a second optically variable effect.

49 Claims, 10 Drawing Sheets

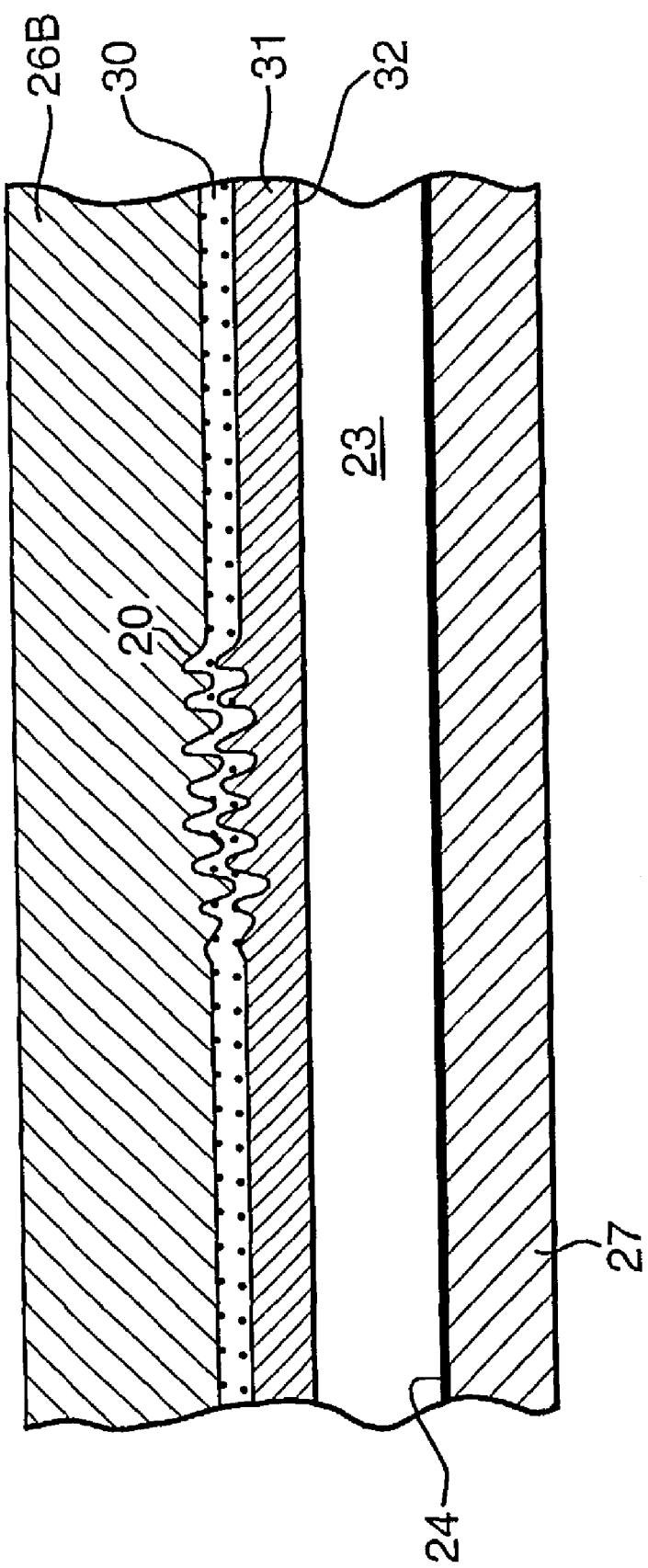

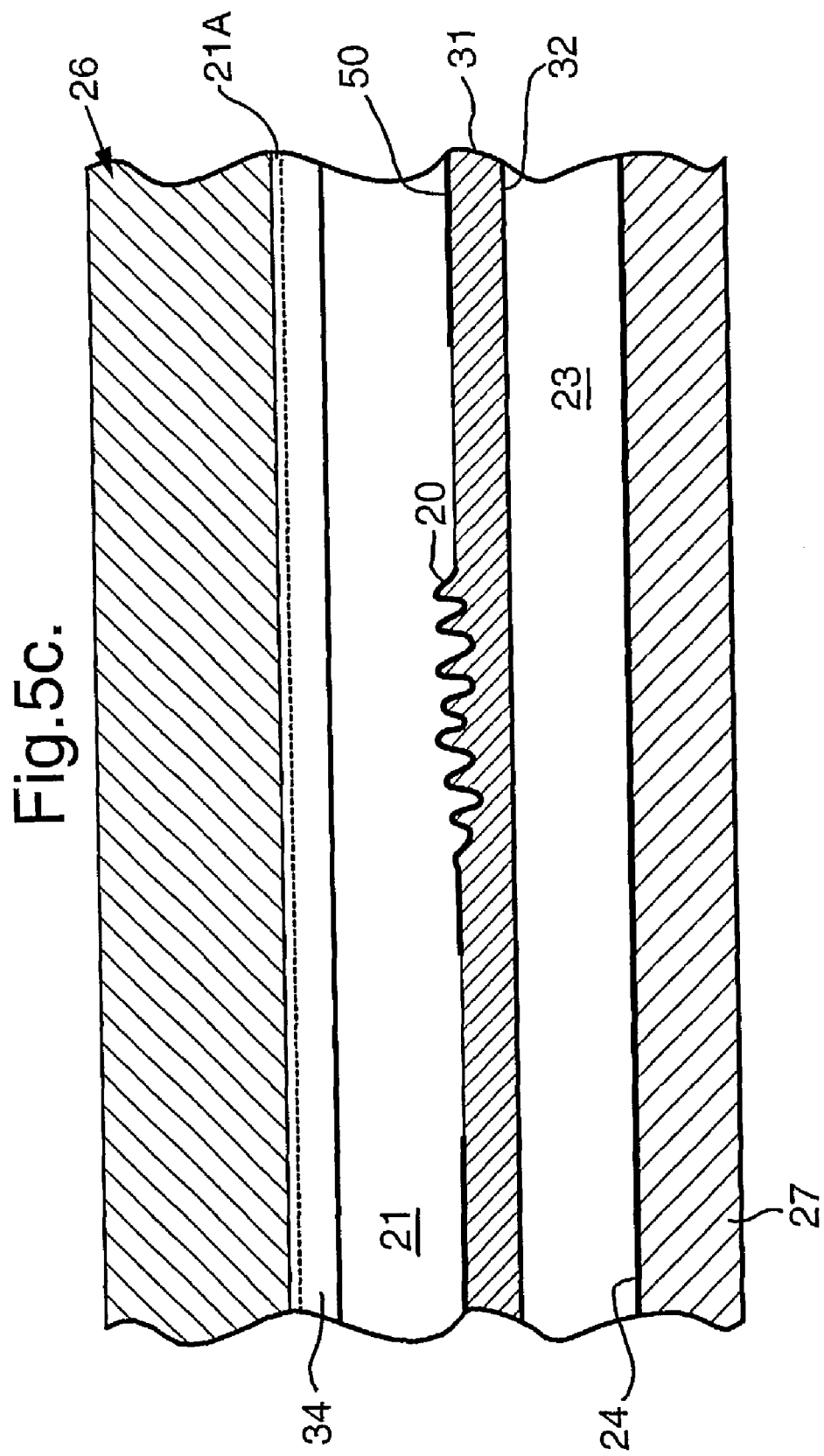

OPTICALLY VARIABLE SECURITY DEVICE

BACKGROUND

The invention relates to an optically variable security device for use, for example, for securing documents and articles against counterfeiting.

The use of optical thin film structures to inhibit counterfeiting and illicit tampering is now a well established art. See for example U.S. Pat. No. 3,858,977, U.S. Pat. No. 4,721,217, U.S. Pat. No. 4,930,866, U.S. Pat. No. 4,994,314, U.S. Pat. No. 5,009,486, EP-A-0733919 and Dobrowolski, J. A, Ho, F. C., and Waldorf, A. J. "Research on Thin-Film Anticounterfeiting coatings at the National Research Council of Canada," Applied Optics, Vol 28, No 14, pp 2702–2717, 1989. These thin film structures often referred to as optical multilayers generally fall into two types; those which are purely dielectric and those which are composed of alternate dielectric (metal oxide or polymer) and metallic layers. The former has the advantage of being transparent and therefore suitable for over-laminate applications, however it requires a minimum of five layers to produce an iridescent device with acceptable luminosity and colour saturation (seen to best effect when located over a dark coloured substrate or background). Whereas the metallic combination functions well with only 3 layers and is therefore significantly cheaper to fabricate. However in both cases the iridescent quality of the multi-layer is strongly influenced by the deposition technology.

SUMMARY

The optically variable effects produced by thin film devices, although attractive and distinctive, are fairly modest when compared to holograms and other diffraction based optically variable devices (DOVID's). For a full review of the various OVD technologies see AOptical Document Security@, chapter 11, editor R. L. van Renesse. Typically at a given viewing angle the observer will see the device replay one colour or hue, while tilting the device substantially within the plane of reflection will either increase or decrease the optical path length travelled by the light rays as they are reflected within the layers thereby causing the device to undergo a colour shift to a contrastingly different colour (in commercial examples a typical shift is from blue-green to gold or red to green). Their appearance can be made more sophisticated by incorporating into them graphical design elements like logos and alphanumeric characters using techniques such as masking (during the vacuum deposition stage) or laser ablation to create voids within the layers, although these substantially add to the fabrication cost of the device and are limited in their scope. However in CA-A-2,172,113 where they teach the art of using UV or e-beam curable acrylate monomer technology to fabricate metallic reflection filters: various low cost non-vacuum methods are described to produce patterned changes in the thickness of the acrylate layer and therefore patterned areas of relative colour shift with the background or hue of the reflection filter. Though it should be said that a consideration of these methods strongly infers that only fairly coarse patterning is possible. In the case of iridescent metallic reflection filters the technique of producing demetallised shapes or indicia in the opaque metal layer, using a chemical etchant has also been used to produce more intricately patterned and therefore secure OVD=s.

In accordance with a first aspect of the present invention, an optically variable security device comprises a thin film reflection filter structure, which exhibits a first optically variable effect; and a relief structure on or in the thin film reflection filter structure, which exhibits a second optically variable effect.

In accordance with a second aspect of the present invention, a method of manufacturing an optically variable security device comprises providing a relief structure on or in a thin film reflection filter structure, the relief structure and the thin film reflection film structure exhibiting different first and second optically variable effects.

We have devised a new security device which has a very characteristic appearance, and by virtue of combining two different technologies is inherently difficult to counterfeit. In preferred examples, an iridescent reflection filter based security device is patterned with graphical elements/areas containing surface relief structures often referred to in the art as an optical microstructure, preferably a diffractive or holographic microstructure—particularly as 1 st order diffractive iridescence has a very different appearance to that produced by thin film interference (in the former, the colour shifts are non-specular and evolve much more rapidly with changes in viewing geometry). Also the diffractive microstructure within the patterned areas can be originated to exhibit clear kinegraphic or spatial movement effects on tipping or rotating the device.

Now it should be appreciated that although thin film iridescence and diffraction are both interference phenomena, the former manifests this phenomena through amplitude division whereas the latter depends on the effect of wavefront division. This means the structures can be combined in two fundamentally different ways: the first way is to fabricate the security device such that the light it directs into the observer=s eye has been subject to (and therefore conditioned by) both amplitude and wavefront division (coupled system) or to fabricate the device such that observed light has only been conditioned by either of these effects acting separately (de-coupled system).

Consider FIG. 1 which shows for simplicity a transparent layer 1 sandwiched between a semi-transparent metal layer 2 and an opaque metal layer 3. Typically, the layer 2 is a partially transparent metal coating, the middle layer 1 is a dielectric (metal oxide or polymer) and the layer 3 an opaque metal coating (usually Al). When a monochromatic beam of light 4 is incident upon the first layer 2, its amplitude will be split or divided by partial reflection: the reflected wave front will propagate directly towards the observer whilst the second transmitted beam will travel an optical path length of $2nd\cos\varnothing r$, where n is the refractive index of the layer 1 before exiting the film and propagating towards the observer (it will also experience a double absorption on twice passing through the first metal layer 2). Clearly if the two wavefronts (or partial amplitudes) travelling towards the observer are to constructively interfere, thus enhancing the reflectivity of the thin film system at that wavelength, then the path difference between all corresponding points on the two wavefronts must equal some integer multiple, p, of the incident wavelength.

Now it can easily be shown that this optical path difference (OPD) is equal to $2nd \cos \varnothing r$; therefore assuming there is the same reflective phase shift at each interface then the condition for constructive interference is given by $$p\lambda\_OPD = 2nd\cos\varnothing r$$

Conversely if the path difference OPD between the two wavefronts is equal to an odd multiple of half wavelengths (i.e. $OPD=[p+\frac{1}{2}]\lambda$) then they will destructively interfere Bthus giving rise to reduced reflectance at that wavelength.

If such a thin film structure is to effectively function as an iridescent reflection filter then we require two things: firstly that the effects of constructive and destructive interference are optimised to achieve a high degree of luminosity and spectral selectivity. Secondly the peak reflective wavelength (i.e. the colour) of the thin film system should visibly change as the observer changes the viewing geometry by a convenient amount, i.e. it must exhibit clear colour shifts when the plane of the device is tipped by around 10 degrees within the plane of reflection (as defined by the light source and observer). The first condition requires that the amplitudes or intensities of the two reflected rays (5) and (6) are as large as possible (maximizes constructive interference) and ideally equal in amplitude so that they cancel each other when 180 degrees out of phase (complete destructive interference). Theoretically this requires that the metals used for the semi-transparent and opaque metal coatings 2,3 should have the highest inate/bulk reflectivities. In particular a metal with a bulk reflectivity approaching 100%, when deposited as a semi-transparent coating (i.e. between 5–12 nm depending on metal used) to create a specified partial reflection, will minimise the loss of light due to absorption. Metals which approach this ideal are Platinum, Palladium, Silver and Aluminium—since the first three are generally in commercial terms too costly this leaves aluminium as the metal used in fabricating the reflective opaque layer. However Aluminium is not chemically stable when deposited at thicknesses less than 10 nm tending to oxidise over time B this constrains us to look at metals such as chromium, Nickel and their alloys. Of these Chromium is the preferred choice.

With regard to colour shift, i.e. the rate at which the peak reflectance wavelength changes with observation geometry, this is proportional to the optical path difference and therefore the product nd B the larger this value the more rapidly the colour of the reflection filter changes with viewing angle. It should also be appreciated that as the thickness increases from say 100 nm onwards (and assuming the refractive index of the dielectric layer to be 2.0), the device will initially function through first order interference (p=1). However at around 180–200 nm the thin film structure supports both first order constructive interference at the red end of the spectrum and second order (p=2) constructive interference at the blue end of the spectrum. We then have created a device which exhibits a red-orange to blue colour shift whereas a device permitting only first order interference will only exhibit continuous/gradual changes in colour, not a colour jump. If we take this further, and increase the layer thickness to around 350 nm then the device will support both second and third order interference producing a red to green colour shift, which evolves more rapidly with angle than the preceding case.

Having outlined the fundamental design and manufacturing criteria for a metallic layer reflection filter we next consider the physics of coupling this system to a sinusoidal relief structure with a pitch of 1 µm (see FIG. 2). Now the pitch of the relief structures that compose a security hologram or DOVID are normally designed or created such that the 1st order replay is approximately at right angles to the plane of the device when illuminated with white light 4. In practice this means holograms and other DOVIDs contain grating structures with periodicities ranging from 0.7. µm to 1.4. µm (hence the choice of 1 µm for inclusion in FIG. 2). As regards the thickness d of the intermediate layer we choose this on the basis of previous discussion to be 0.2 µm.

If we now consider rays incident at two different points, A and B, on the first (partially metallised) interface 2. At each point we see that, as before, a fraction of the incident wavelet amplitude is directly diffracted/reflected into the observer's eye. It should be clear however from this scale drawing that this optical path is very different for the two points of incidence on the relief, i.e. the optical path at point A is twice that at point B. It therefore follows that if at some wavelength the partial amplitudes of the light ray diffracted from the upper and lower interface at point A are in phase, then those at point B may be near to being in antiphase and therefore cancel out.

Although to simplify the argument we chose two points of incidence on the relief profile that had markedly different path lengths, it is clear that for the periodicities that characterise most holograms or DOVIDs (less than 1.3 um) the processes of diffraction (wavefront division) and thin film interference (amplitude division) will not in general couple efficiently together (i.e. the processes of constructive and destructive interference can never be optimised across all of the wavefront) leading to reduced luminosity and spectral selectivity.

There will however be cases where it is desirable to suppress certain colours in the diffraction spectrum of a hologram/DOVID in which case the drawbacks of this coupled system become secondary. Also this coupled system tends to have the most direct fabrication routes: one route would be to first emboss the holographic foil with holographic image generating microstructure, preferably in defined or selected areas. This microstructure is then vacuum coated with first the semi-transparent metal coating, then the dielectric layer, then the opaque metal layer, then (optionally) a protective coating for increased chemical durability and finally an adhesive coat.

However if the dielectric layer is composed of a U cured acrylate, then we can take advantage of the fact that such a material is mechanically Anon glassy@ (i.e. ductile) and therefore embossable. We therefore fabricate our coupled device by, as before, first depositing a semi-reflective metal coating onto the carrier foil which depending on application may or may not be release coated. We next deposit our u.v. or e-beam cured/polymerised acrylate using the sequence of flash evaporation, condensation and u.v./e-beam irradiation described in CA-A-2,172,113 and then emboss the holographic generating structure directly into the back surface of the reflection filter (with the opaque metal coating, generally aluminium, facing the embossing die or shim). Again a preferred embodiment would be to confine the microstructure to a pattern of selected areas such that the reflection is decoratively patterned with holographic microstructure.

We propose here further developing the above fabrication process by flash evaporating protective acrylic layers either before the deposition of the first semi-reflective metal coating or after the deposition of the final opaque reflective metal coating or in some cases both (though the former, acting as a protective overcoat is particularly pertinent to the case where carrier foil is simply a temporary substrate i.e. release layer present). In either case the molecular composition of the acrylate monomer can be adjusted to give the desired chemical or mechanical durability.

Now it is known in the art (of vacuum coating science) that achieving optimal adhesion between two coatings requires that the structure remain under vacuum in between the respective coating stages. We therefore propose a refinement of the fabrication process in order to produce a more tamper evident iridescent device. Specifically this could be achieved in two ways: the simplest embodiment is to admit air into the vacuum chamber (i.e Abreaking the vacuuma) between the deposition of the first semi-transparent metal coating and the deposition of the dielectric layer or coating.

Alternatively a molecular species can be introduced into the vacuum which adsorbs on to the surface of the first coating and then a second coating is deposited. We thereby creating a weak interface between the two coatings. Therefore in an attempt to remove the security device from the article it is protecting, this weak layer will fail before the adhesive and in failing irreparably and obviously change the appearance of the device.

Finally in relation to the coupled device we have assumed that the opaque metal coating is continuous B however we could modify the fabrication stage such that this layer was spatially pattern metallised to create transparent decorative shapes, meaningful forms of indicia (e.g. letters, numbers) or a halftone pattern of transparent dots. The fabrication of this discontinuous metal coating could be effected in a number of ways: one method would be to print an oil mask on to the dielectric layer before vacuum coating the metal layer (the metal would adhere only to the oilBfree areas). A second method would be to print an etchant directly onto the back of the metal (in the case of aluminium, a suitable etchant would be sodium hydroxide). Alternatively a third method would be to print an etchant resistant mask on to back of the aluminium before uniformly coating with etchant. Note in methods two and three a final wash off stage will be required to remove etchant and dissolved metal.

So far we have proposed ways of fabricating coupled devices which redirect into the observers eye only that light which has been subject to the combined effect of the two iridescence generating structures (e.g. surface relief microstructure and thin film reflection filter). However as we have alluded to earlier their may be many cases where it is for example desirable to observe the full diffractive rainbow spectrum of the holographic generating structure, in which case we need to decouple the two iridescence generating mechanisms. Herein we propose two distinct approaches or arrangements for achieving this: in the first arrangement, one or more opaque regions, typically achieved through metallisation, may be provided between the holographic image generating structure and the thin film reflection filter structure. This provides a way of shielding the relief structure from the thin film reflection filter so that the holographic image can be viewed, despite the presence of the thin film reflection filter structure.

Advantage can be taken of the presence of the opaque regions, to design them in predetermined shapes. In some examples each region may define one or more of a crest, logo, character or indicia, or a, preferably elongate, shape through which moving patterns of diffractive light progress.

In another arrangement, one or more layers/coatings are provided between the holographic image generating structure and the thin film reflection filter that are substantially transparent. These would include one or more high refractory layers (dielectric or semiconductor) and one adhesive layer (preferably of high optical clarity). The refractory layer or layers should be composed (i.e. have the relative refractive indices and coating thicknesses) in such a way as to enhance the reflectivity or luminosity of the holographic image generating structure.

As with the opaque layers mentioned above, the additional layers or coatings can be confined to only those areas that contain holographic image generating structure and typically may be in the form of crests, logos and the like as mentioned above in connection with opaque layers.

So far we have made the assumption that the diffractive microstructure supports devices that are viewed in the first diffracted order. However, the above fabrication methods could equally apply to zero order diffraction devices (ZODs). These are devices in which the periodicity of the relief is around 0.4 µm or less so that for visible light no first order diffractive effects exist at normal incidence illumination. The preferred shape of the relief is rectangular and the depth of the relief is ideally greater than or equal to the pitch. For a thorough review of the characteristics of these devices and their role in optical security, the reader is referred to Gale, M. T., Knop, K., and Morf, R., "Zero-order diffractive microstructures for security applications" SPIE vol.1210 Optical Security and Anticounterfeiting Systems, Los Angeles 1990, pp83–89 and more recently in chapter 12 of the publication "Optical Document Security" by R. L. van Renesse. What is relevant to this discussion is that their iridescence is superficially similar in appearance to conventional reflection filters with one significant difference, which is that their specular (i.e. zero order) reflection is rotationally variable.

Specifically rotation of the microstructure in its own plane leads to a major change in colour. For example, when the grating grooves lie at right angles to the plane of reflection (the normal viewing mode) the device may have been designed to appear green. When, however, the ZOD is rotated such that grooves lie in the plane of reflection the device will appear brown in hue. We herein propose combining this contrasting rotational behaviour between a ZOD and a thin film interference reflection filter with our general theme of confining the microstructure to selected areas or regions that our superposed over the reflection filter (e.g. patterning the reflection filter with microstructure) to create a new security device, which both in terms of optical variability and decorative effect, has a differential appearance.

An example of one possible embodiment would be to compose the device such that for one orientation, the ZOD (microstructure grooves at right angles to the plane of reflection) and the reflection filter have been designed to reflect green/blue light and no decorative patterning will be evident; however on rotation by 90 degrees the ZOD areas will reveal themselves as a patterned areas of brown colour shift on a green/blue background. In other examples the patterning of the reflection filter with areas of ZOD microstructure can be made more visually complex by changing the orientation or pitch of the ZOD microstructure from area to area. Indeed in a further refinement within each of the selected areas the orientation/pitch of the ZOD microstructure can be modified to create a zero-order image within each area.

We have already discussed the limitation, that for the 1 Φm grating periodicity typical of a hologram/DOVID, multilayer enhancement is ineffective, degrading both the thin film interference and diffractive effects. However, at significantly longer periodicities such as 3 Φm or more it can be shown graphically that every point on the wavefront travels a near equal (double pass) optical path length within the film. In other words a reflection filter will function efficiently when applied or conforming to relief structures with a periodicity 3 Φm. Now if these relief structure are fabricated to be triangular profiles, and if they have a periodicity of 5 Φm or more, then they will start to exhibit refractive/reflective characteristics as well as diffractive i.e. they will function as lenticular microprisms or micromirrors. We therefore propose directly embossing decoratively and securely patterned areas of this relief structure into a metal/polymer reflection filter—although direct deposition could also be use for Aglassy, non-embossable dielectrics@.

It should be appreciated that the effect of impressing the think film structure with the profile of these coarse microprisms/micromirros will be to locally change the specular normal and therefore colour replayed by the thin film structure. We would therefore have a security device consisting of an iridescent reflection filter which at one orientation will be decoratively patterned with areas of a different iridescent hue or colour) prism grooves perpendicular to axis of reflection). When the observer rotates the device by 90 degrees these patterned areas will progressively transform into the same colour as the background (prism/grooves along axis of reflection).

It is well known that the random surface relief created by holographically recording the speckle irradiances pattern generated by a suitable diffusing screen, will in turn, when embossed into metallised foil produce reflective diffuser with a whitish hue.

In another example, therefore, we provide a device in which an iridescent reflection filter is decoratively and intricately patterned (e.g. with logos, text, microtext etc.) with areas of random diffuse microstructure. This can be most simply achieved by directly embossing into a metal/polymer thin film system. The random microstructure will substantially suppress the specular iridescence created by the thin film structure and ideally replace it with one, which has a distinctive whitish hue.

The security device can be used on a wide variety of documents and articles including visas, passports, licences, cheques, identity cards, plastic cards, bank notes, tickets, bonds, share certificates, vouchers, passes, permits, electrostatic photocopies electrostatic laser printed materials, brand authentication labels, serial numbering slips, quality control certificates, bills of lading and other shipping documentation, legal documents and tamper evident labels. It can also be used in embedded features such as security threads.

BRIEF DESCRIPTION OF THE DRAWINGS

Some examples of security devices and methods according to the invention will now be described with reference to the accompanying drawings, in which:

FIGS. 4A, 4B, 5A, 5B and 5C are schematic cross-sections through first to fifth examples of decoupled security devices according to the invention; and, FIGS. 6 to 8 are schematic cross-sections through sixth to eighth examples of coupled security devices according to the invention.

DETAILED DESCRIPTION OF EMBODIMENTS

Figure 1:
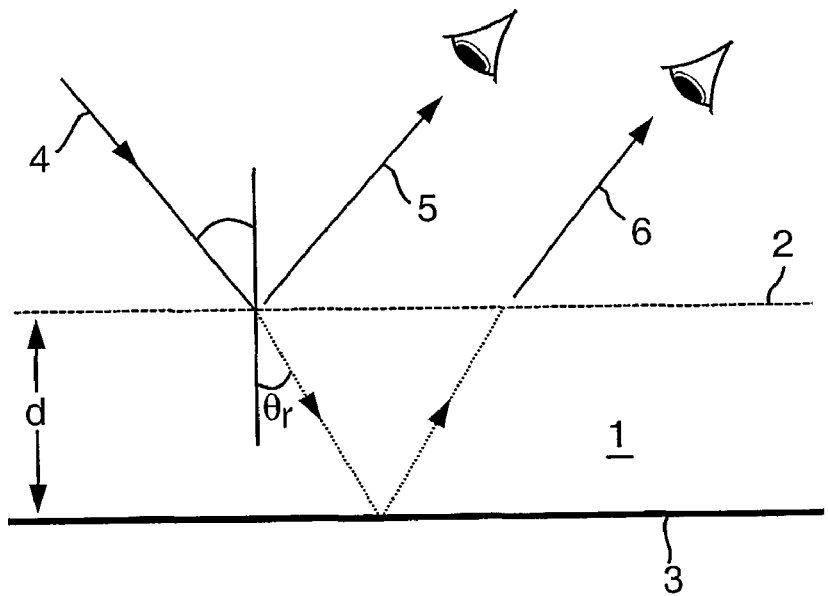
FIGS. 1 and 2 are schematic, cross-sections through devices to show the problems of combining thin film reflection filters with surface relief holographic image generating structures.
Figure 2:
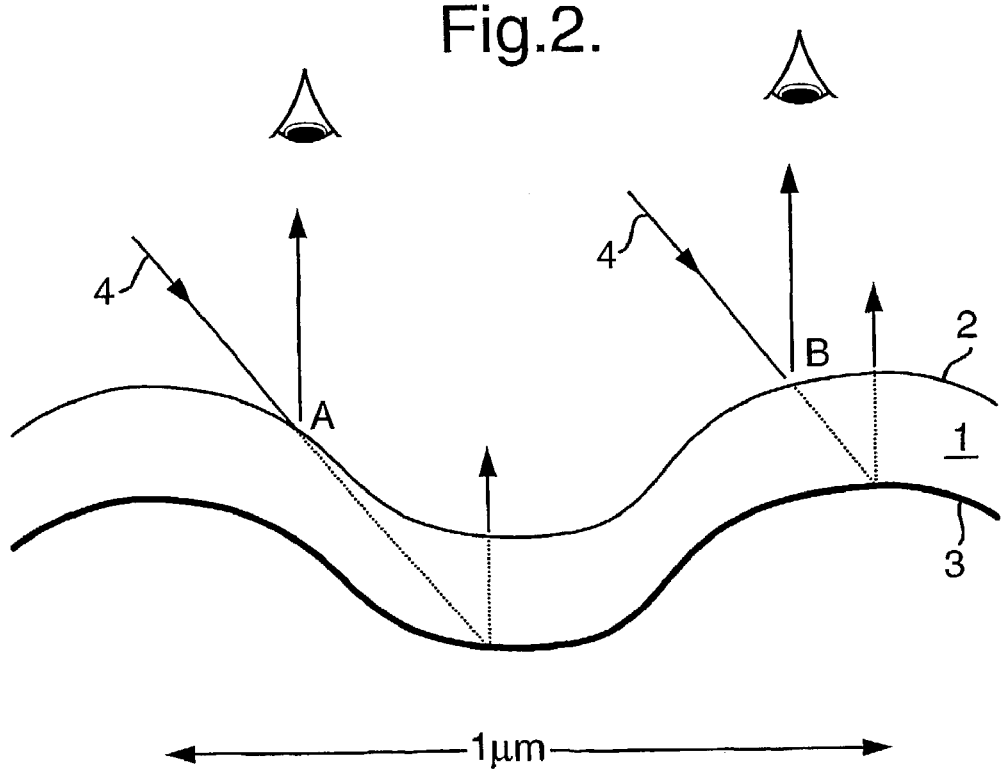
Figure 3:
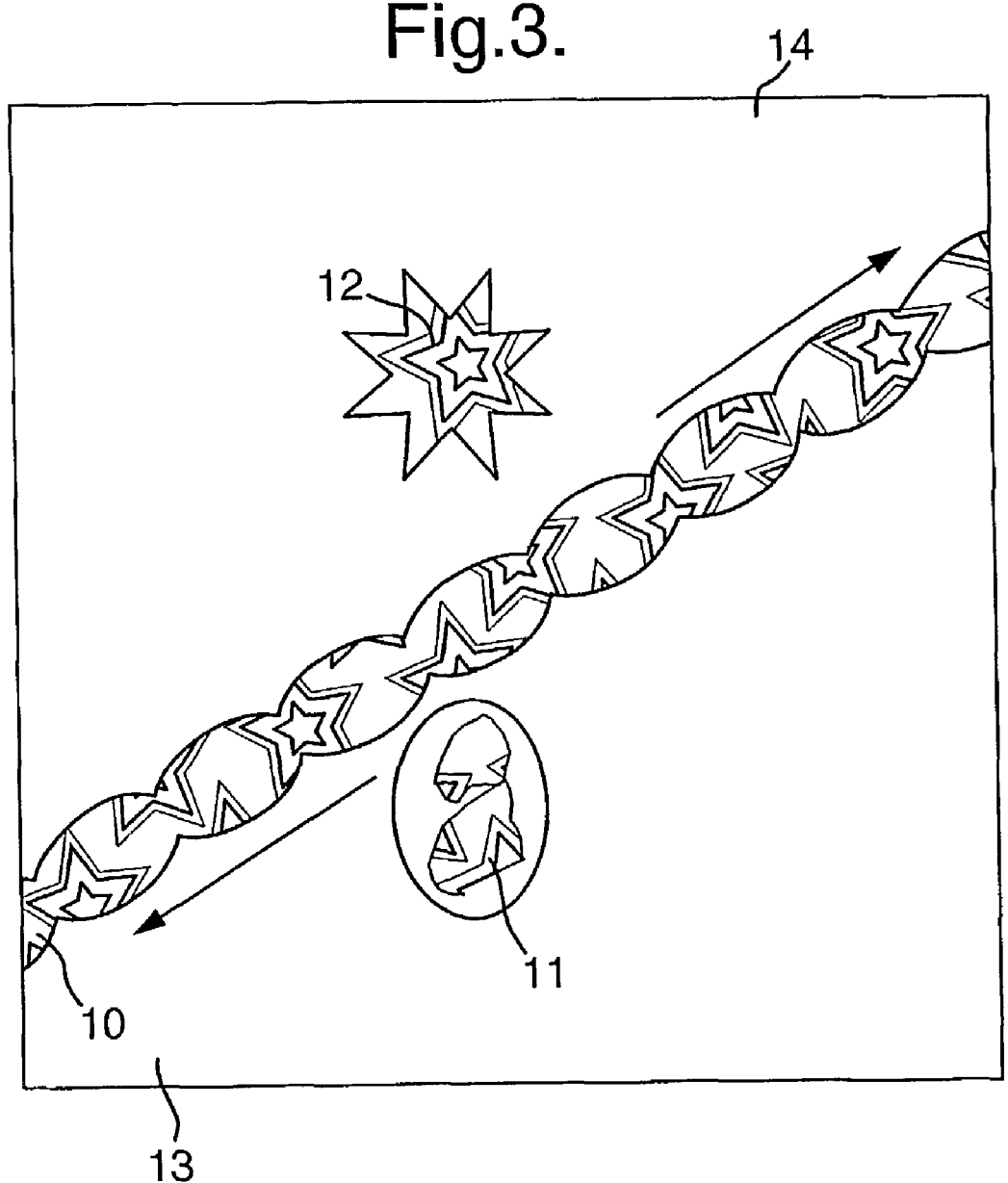
FIG. 3 is a plan of an example of a security device according to the invention.

The appearance of a typical decoupled device is shown in FIG. 3 in which the diffractive microstructure (holographic imagery) 10–12 is confined to patterned areas or domains that are opaquely metallised—the reflection filter acting as an iridescent background. Although not visible in FIG. 3, the background will exhibit different colours in the regions 13,14, the colours gradually merging when they meet.

These areas or domains 10–12 will have shapes which are aesthetically relevant to holographic imagery contained within them—they may be crests, logos, characters or elongated shapes through which moving patterns of diffracted light could progress.

This decoupled device could be fabricated in several ways depending on the proposed application and composition of the reflection filter. The first way (FIG. 4A) would be to first emboss the patterned areas of holographic imagery 20 into a 1–5 Φm thick lacquer layer 21 of a holographic foil 26. The foil 26 also comprises a carrier 25, typically 12–25 Φm thick polyester (PET), and a wax or silicone release layer 21A, typically 0.01–0.1 Φm thick.

An opaque metal coating 22A, for example 20–50 nm thick Al is then coated or applied to one or more selected regions, preferably in register with the microstructure 20, as shown. This can be achieved either by directly printing an oil mask prior to the metal coating or by applying the metal coating and the selectively demetallising.

Next a semi-reflective coating 22, such as Cr, Ni or alloys such as Ni-chrome, 5–12 Φm thick is applied.

The complete area of the foil (on the microstructure side) is then successively coated, layer after layer to build up the desired thin film system 23. The dielectric layers may be metal oxides with thicknesses in the range 0.1–1 μm (preferably 0.2–0.5 μm) or acrylates (embossable)—typically these are created by flash evaporation of the monomer acrylate, followed by condensation onto the foil, followed by e-beam or UV curing. Suitable molecular weights for the monomer lie in the range 150–600 but especially 200–300. Thicknesses as for dielectrics. An example of a particular acrylate composition would be:

| Lauryl Monoacrylate | 48.5% pbw |
|---|---|
| Tricyclic hydrocarbon diacrylate | 48.5% pbw |
| Adhesion Promoters | 30.0% pbw |

A fully reflective opaque metal layer 24 such as 30–50 nm thick Al is then coated on the dielectric layer 23. A hot melt or pressure sensitive adhesive layer 27 is then coated on the layer 24 to a typical thickness of 0.5–20 μm.

The materials and thicknesses mentioned above are also applicable to the examples to be described below where the same reference numerals are used to identify similar layers.

Figure 4A:
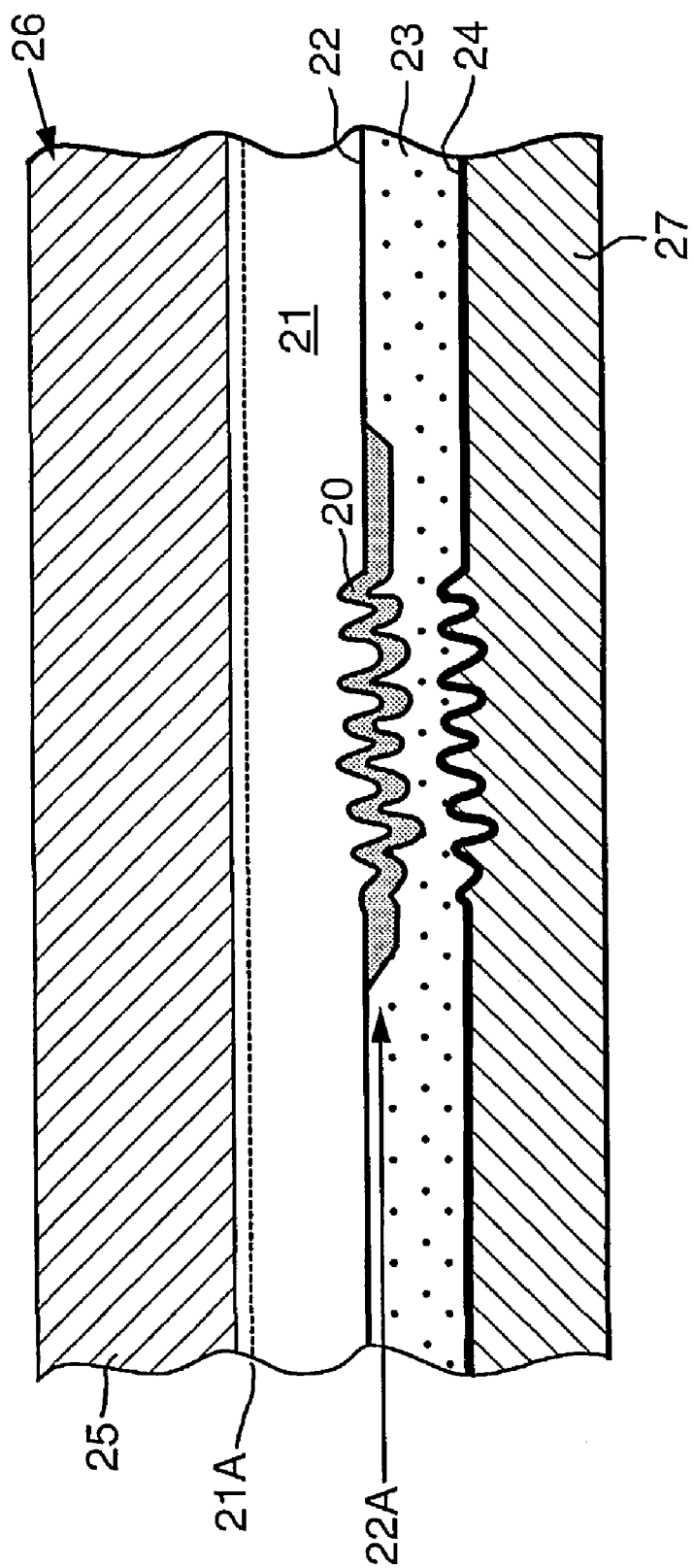
Figure 4B:
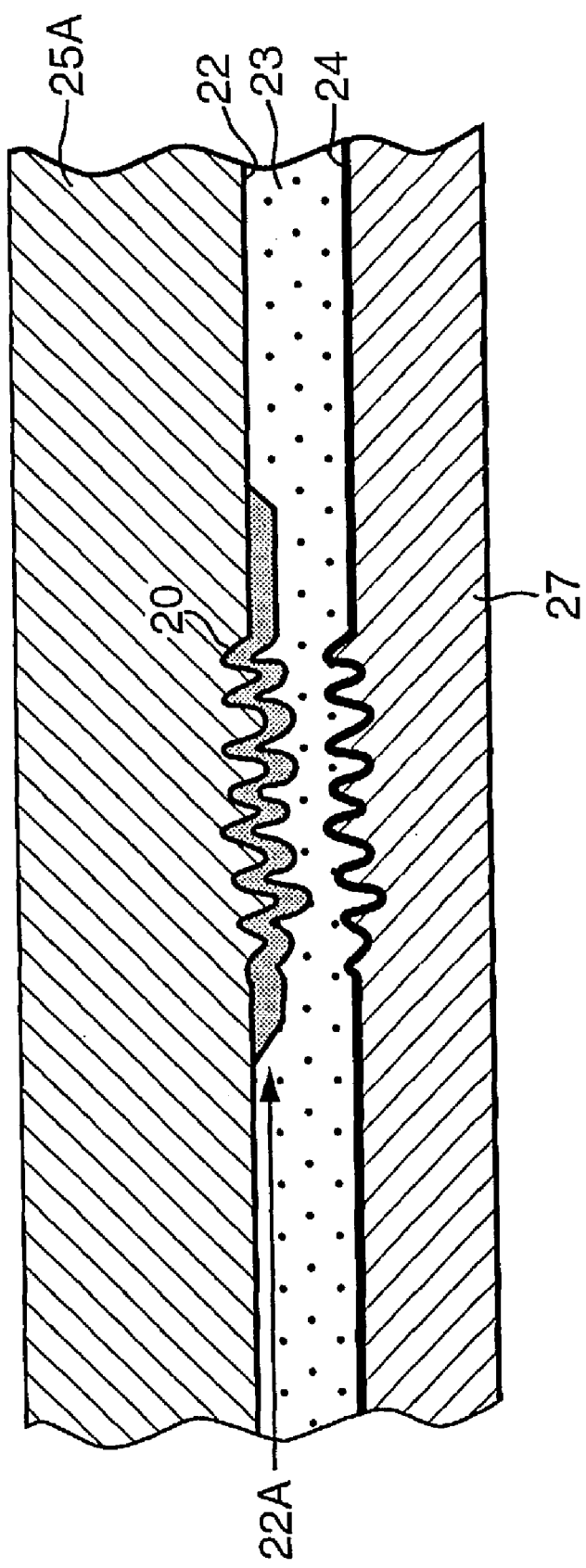

FIG. 4B illustrates a modified form of the FIG. 4A example in which the embossed lacquer layer is omitted, and the microstructure is embossed directly into the carrier 25A without an intermediate release layer. In this case, the carrier layer 25A is transparent to enable the device to be observed after it has been transferred on to a substrate. The carrier 25A may be 12–25 micron thick polyester but could also be polypropylene or PVC, with thicknesses in the range 10–60 Φm. This structure is suitable for labels (with a pressure sensitive adhesive 27) or for threads with an optional heat activated adhesive. The remaining layers are provided in a similar manner to FIG. 4A. However, an optional protective back coat could be provided between layers 24 and 27, particularly if the device will be used in a thread. This could be another UV curable acrylate provided in the same coating run as the layer 24.

The second approach would be to take a prefabricated thin film system and coat it with an embossable lacquer and then repeat the above sequence of patterned embossing and demetallisation. Next, the embossed lacquer is coated with a protective varnish (e.g. UV curing) and then finally laminated to a release coating carrier film (i.e. polyester) and adhesive coat.

The third approach would be simply to take the demetallised/pattern metallised embossed film (release coated carrier included if required) such as a therformable foil and laminate to it (using an optically clear adhesive) the prefabricated thin film system. For the layer 23A, the monomer deposited acrylate layers described in CA-270113 are suitable.

In a further example, a therformable foil is embossed with the desired surface relief microstructure coated with one or more refractory (substantially transparent) layers, which may or may not be in register with the surface relief regions and then laminated to a thin film reflection filter structure.

Figure 5A:
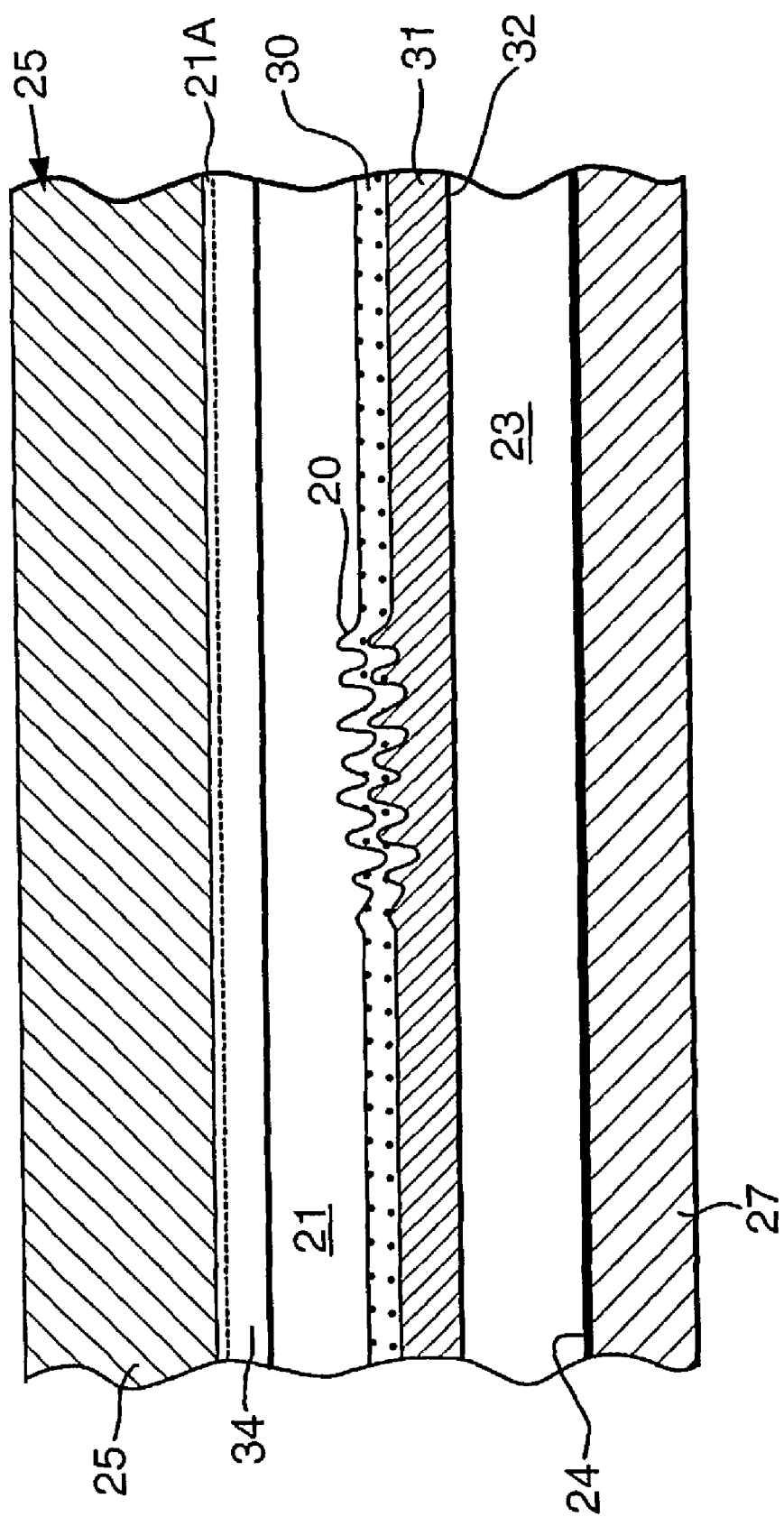

In the examples described above, an opaque metal layer 22A is provided between the microstructure and the thin film reflection structure 23. FIG. 5a illustrates an example of a decoupled system. A holographic foil 26 is embossed as in FIG. 4A. In this case, the foil is provided with an additional protective coating 34 (which could also be used in FIG. 4A). This provides mechanical and chemical durability and is typically 1–5 Φm thick. Next one or more reflective enhancing dielectric layers (only one shown in FIG. 5A) is applied. These layers could be coated in a spatially continuous manner over the entire area of the foil—or using masking techniques they could be applied/deposited over only the areas containing the holographic imaging or microstructure. A clear laminating adhesive layer 31 is coated onto the HRI layer 30, following which this structure is laminated to a previously fabricated reflection filter comprising a transparent, thin metal layer 32 of for example Cr or Ni, a thin film reflection filter layer 23, and an opaque metal layer 24. If required, an adhesive 27 is then applied. If desired, the HRI layer 30 can be confined to one or more regions between the microstructure 20 and the thin film reflection filter structure 23.

FIG. 5B illustrates a modification of the FIG. 5A example, in which the microstructure 20 is embossed directly into the carrier 25B. In this case, the carrier 26 will not be removed from the device when it is transferred onto a substrate.

FIG. 5C illustrates another modification of FIG. 5A in which the layer 30 is replaced by a discontinuous metal layer 50. In the preferred example, the layer 50 is 30–50% demetallized. As can be seen, the layer 50 is registered with the microstructure 20 as well as having non-registered portions.

Figure 6:
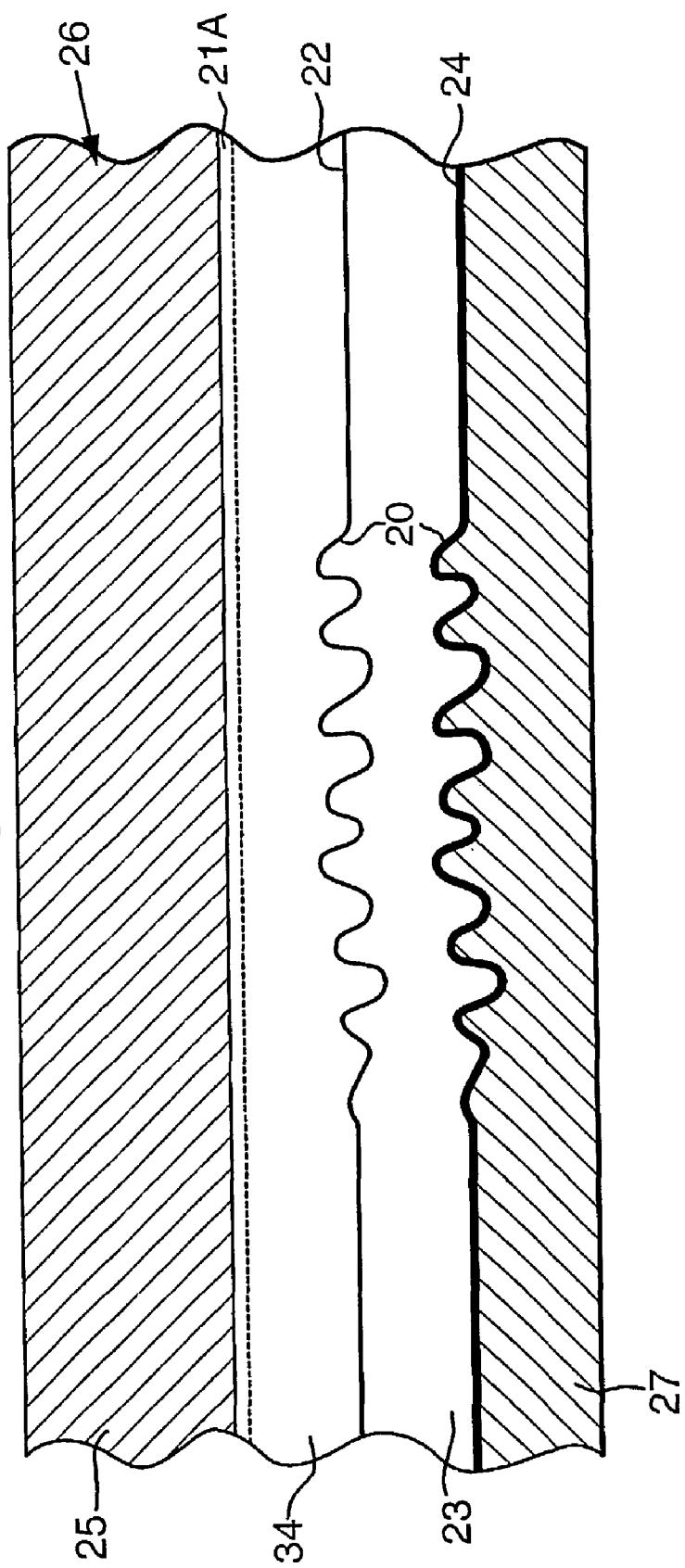

The examples described above are all decoupled systems. FIG. 6 illustrates a first example of a coupled system. In this example, a holographic foil 26 comprising a carrier 25 and release layer 21A, for example a hot stamping foil or a cold transfer foil, is used, and a protective coating 34, ideally composed of UV durable acrylate monomer is applied. Next a semi-reflective metal coating 22 is provided on the layer 34, the coating, as before, typically comprising 5–12 nm thick chrome, Ni or alloy.

A dielectric layer 23 is applied, this being a suitable UV curable acrylate monomer and then the dielectric layer 23 is coated with an opaque fully reflective metal layer 24, such as aluminium, having a thickness in the range of 30–50 nm. This structure is then embossed with a surface relief microstructure 20 and finally an optional, adhesive coating 27 is applied, such as a hot melt or pressure sensitive adhesive.

Figure 7:
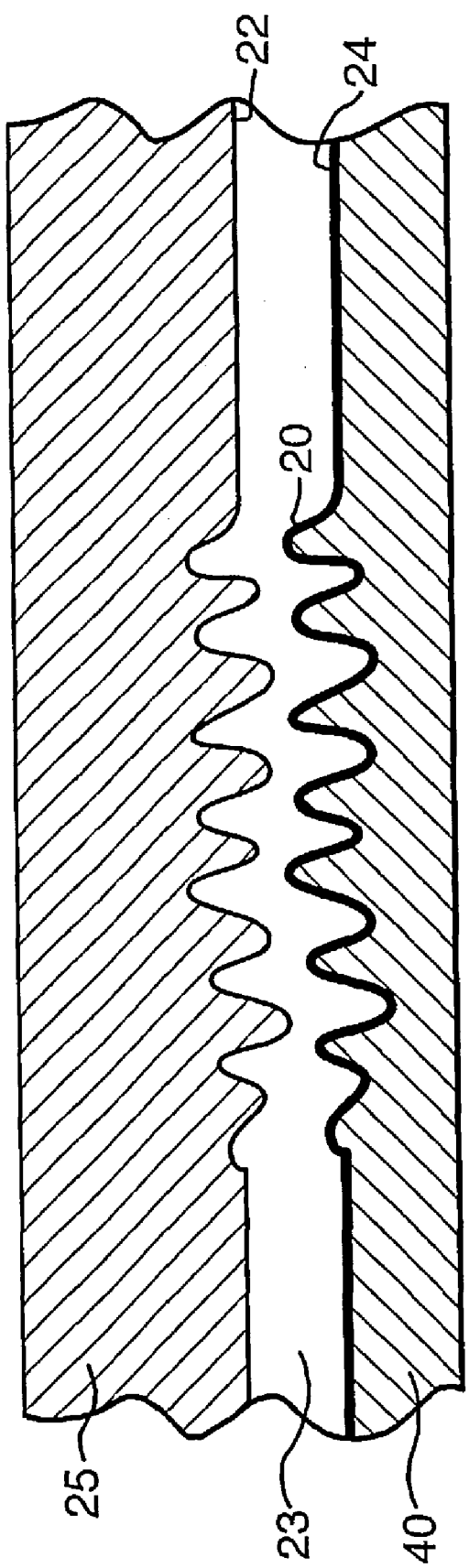

FIG. 7 is similar to the structure of FIG. 6, except that the release layer 21A and protective layer 34 are omitted, so that the carrier 25 will form part of the finished device. Further, the adhesive layer 27 is replaced by a protective coating 40, such as UV curable acrylate. This structure is suitable for use as a thread.

Figure 8:
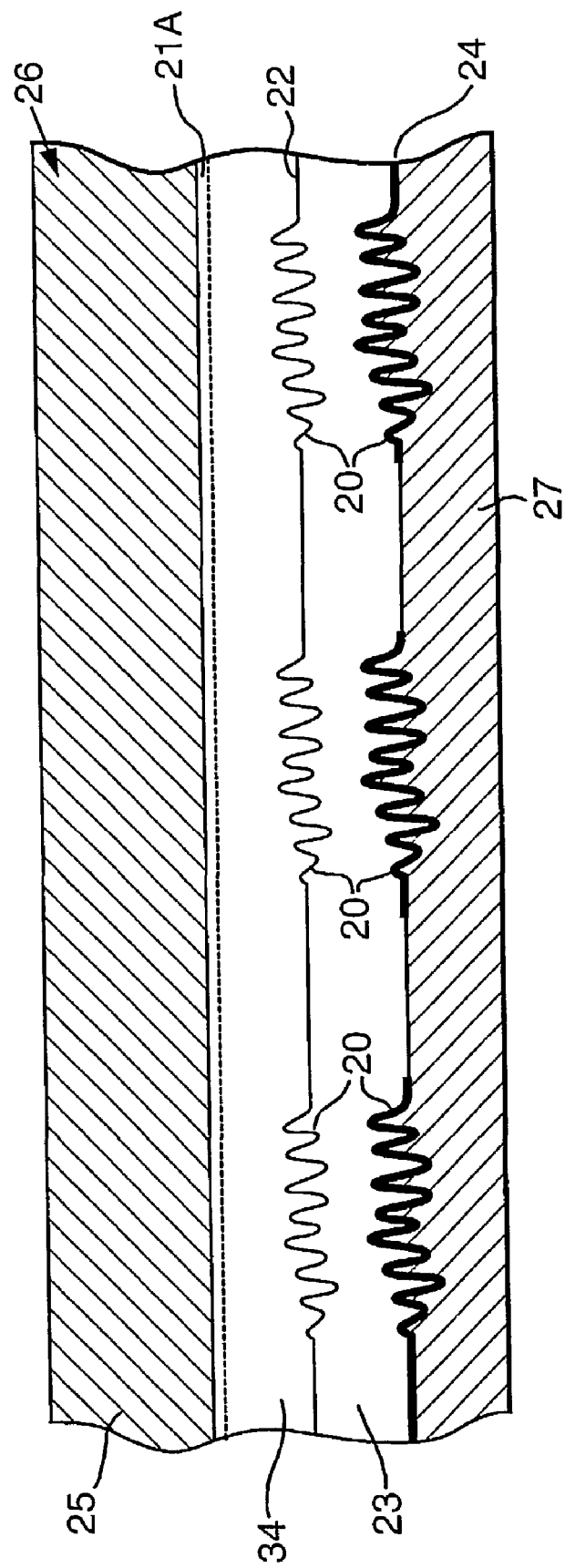

Finally, FIG. 8 illustrates a structure based on the FIG. 6 example, and in which the layer 24 is patterned to match the microstructure regions 20.

The invention claimed is:

1. An optically variable security device comprising a thin film reflection filter structure which exhibits a first optically variable effect; a relief structure which exhibits a second optically variable effect, the relief structure being provided on a layer separate from and superposed on the thin film reflection filter structure; and a decoupling layer between the relief structure layer and the thin film reflection filter structure, the decoupling layer being constructed such that a light ray impinging on the side of the device nearest the relief structure layer is directed into the observer's eye after being primarily conditioned by only one of the relief structure and the thin film reflection filter structure.

2. A device according to claim 1, wherein the relief structure is a microstructure.

3. A device according to claim 2, wherein the relief structure is a first order diffractive or holographic image generating structure.

4. A device according to claim 3, wherein the relief structure includes a reflection enhancing layer.

5. A device according to claim 4, wherein the reflection enhancing layer comprises an opaque or semi-transparent metallisation.

6. A device according to claim 5, wherein the metallisation is provided in selected regions.

7. A device according to claim 5, wherein the reflection enhancing layer constitutes a second decoupling layer.

8. A device according to claim 4, wherein the reflection enhancing layer is substantially transparent and comprises a high refractive index dielectric and metal oxide material.

9. A device according to claim 1, wherein the relief structure comprises a zero order diffraction device.

10. A device according to claim 9, wherein the zero order diffraction device is constructed so that it is not visible against a background defined by the thin film reflection structure in one orientation of the device, but is visible in another orientation.

11. A device according to claim 1, wherein the relief structure comprises a spatially random and diffusely scattering microstructure.

12. A device according to claim 1, wherein the decoupling layer comprises at least one opaque region between the relief structure and the thin film reflection filter structure.

13. A device according to claim 12, wherein the at least one opaque region defines a pattern in register with the relief structure.

14. A device according to claim 12, wherein the at least one opaque region overlaps the relief structure.

15. A device according to claim 12, wherein the at least one opaque region follows the contour of the relief structure.

16. A device according to claim 12, wherein the least one region defines one or more of a crest, logo, character or indicia, or a, preferably elongate, shape through which moving patterns of diffractive light progress.

17. A device according to claim 1, wherein the decoupling layer comprises one or more layers/coatings, between the surface relief structure and the thin film reflection filter structure which are substantially transparent whereby the thin film reflection structure does not exhibit the surface relief.

18. A device according to claim 17, wherein the decoupling layer comprises an adhesive.

19. A device according to claim 1, wherein the thin film reflection filter is visible through the relief structure.

20. A device according to claim 1, wherein the thin film reflection filter comprises at least five dielectric metal oxide layers.

21. A device according to claim 1, wherein the thin film reflection system is absorbing and substantially opaque multi-layer system and comprises a semi-transparent metal layer, a dielectric metal oxide or polymer layer and an opaque metal layer.

22. A device according to claim 1, wherein the relief structure has a periodicity of at least three microns.

23. A device according to claim 22, wherein the periodicity is at least five microns.

24. A device according to claim 23, wherein the relief structure has a triangular profile.

25. A device according to claim 1, wherein the relief structure functions as a set of lenticular microprisms or micromirrors.

26. A method of manufacturing an optically variable security device, the method comprising forming a relief structure in a support layer, providing a decoupling layer on the support layer, and providing a thin film reflection structure on the decoupling layer, the decoupling layer being constructed such that a light ray impinging on the side of the device nearest the relief structure layer is directed into the observer's eye after being primarily conditioned by only one of the relief structure and the thin film reflection filter structure.

27. A method according to claim 26, wherein the support layer comprises a lacquer detachably attached to a carrier layer.

28. A method according to claim 26, further comprising coating a reflection enhancing layer on the relief structure.

29. A method according to claim 28, wherein the reflection enhancing layer is a metallisation.

30. A method according to claim 28, wherein the reflection enhancing layer comprises a high refractive index material.

31. A method according to claim 26, wherein the decoupling layer comprises an opaque metallisation.

32. A method according to claim 26, wherein the decoupling layer comprises a transparent intermediate layer having a thickness such that the thin film reflection structure does not exhibit the surface relief.

33. A method according to claim 26, wherein the decoupling layer comprises an adhesive.

34. A method according to claim 26, wherein the thin film reflection filter comprises at least five dielectric metal oxide layers.

35. A method according to claim 26, wherein the thin film reflection film comprises a semi-transparent metal layer, a dielectric metal oxide or polymer layer and an opaque metal layer.

36. A method according to claim 35, wherein the thin film reflection film comprises a UV or e-beam cured acrylate.

37. An optically variable security device comprising a thin film reflection filter structure, made up of a plurality of layers, which exhibits a first optically variable effect; and a relief structure on or in the thin film reflection filter structure which exhibits a second optically variable effect, the relief structure having a periodicity of at least 3 µm and substantially greater than the thickness of each layer within the film structure, such that the thin film reflection filter structure functions as a planar device to the extent that for a given angle of incidence and reflection, light rays entering the observer's eye are subject to the combined interference effects of amplitude division by the thin film reflection filter structure and wave front division by the relief structure and traverse similar optical path lengths through the device to the extent that both interference processes function efficiently.

38. A device according to claim 37, wherein the relief structure is a microstructure.

39. A device according to claim 37, wherein the relief structure functions as a set of lenticular microprisms or micromirrors.

40. A device according to claim 37, wherein the thin film reflection filter comprises at least five dielectric metal oxide layers.

41. A device according to claim 37, wherein the thin film reflection system is absorbing and substantially opaque multi-layer system and comprises a semi-transparent metal layer, a dielectric metal oxide or polymer layer and an opaque metal layer.

42. A device according to claim 37, wherein the periodicity is at least 5 microns.

43. A device according to claim 37, wherein the relief structure has a triangular profile.

44. A method of manufacturing an optically variable security device, the method comprising providing a thin film reflection filter structure, made up of a plurality of layers, which exhibits a first optically variable effects; and providing a relief structure on or in the thin film reflection filter structure which exhibits a second optically variable effect, the relief structure having a periodicity of at least 3 µm and substantially greater than the thickness of each layer within the film structure, such that the thin film reflection filter structure functions as a planar device, to the extent that for a given angle of incidence and reflection, light rays entering the observer's eye are subject to the combined interference effects of amplitude division by the thin film reflection filter structure and wave front division by the relief structure and traverse similar optical path lengths through the device to the extent that both interference processes function efficiently.

45. A method according to claim 44, the method comprising securing the thin film reflective filter to a carrier; and embossing the surface relief in the thin film reflective layer.

46. A method according to claim 44, wherein the relief structure is provided in a layer releaseably supported on a carrier.

47. A method according to claim 44, further comprising providing adhesive on the surface of the device furthest from the carrier.

48. A method according to claim 44, wherein the relief structure functions as a set of lenticular microprisms or micromirrors.

49. A method according to claim 44, wherein the periodicity is at least 5 microns.

* * * * *